Inventors
ALLAN P. COLBURN
BARNETT F. DODGE
By Ralph L. Chappell
Attorney

Oct. 9, 1951  A. P. COLBURN ET AL  2,571,014
PURIFICATION OF A CONFINED ATMOSPHERE BY
A PROCESS OF REFRIGERATION
Filed Nov. 16, 1945  4 Sheets-Sheet 2

Inventors
ALLAN P. COLBURN
BARNETT F. DODGE

By Ralph L. Chappell
Attorney

Patented Oct. 9, 1951

2,571,014

UNITED STATES PATENT OFFICE 2,571,014

PURIFICATION OF A CONFINED ATMOSPHERE BY A PROCESS OF REFRIGERATION

Allan P. Colburn, Newark, Del., and Barnett F. Dodge, Hamden, Conn., assignors to the United States of America as represented by the Secretary of the Navy Application November 16, 1945, Serial No. 629,162

2 Claims. (Cl. 62—175.5)

This invention relates to a process of purifying air. Further, it relates to a process of purifying air or atmosphere from a confined space; and in particular to a process of purifying the atmosphere of a submarine by refrigeration. Reference is hereby made to the applicants' copending application Serial Number 628,605 of November 14, 1945, now Patent No. 2,545,194 of March 13, 1951, and application Serial Number 628,608 which is now abandoned.

At present it is customary to purify the atmosphere of a submarine by chemical reaction of the carbon dioxide in the impure atmosphere with an hydroxide. The hydroxide most commonly used today is that of lithium which is placed around on shelves or in canisters, within the submarine, so that the atmosphere in the submarine comes into contact with this compound. This is a very efficient process, removing practically all of the $CO_2$ while the hydroxide is active; but it has a limitation of lasting only a certain number of hours. This fact necessitates the carrying of an extra supply of the salt in order to have a sufficient quantity available for a long cruise.

The present invention has been made with the idea of overcoming this limitation and it has for its objects:

First, to provide a process to remove the carbon dioxide and moisture from the air by refrigeration;

Second, to provide a process which is continually operable and which does not depend on the reaction of the carbon dioxide with a chemical compound for its removal;

Third, to provide a process which is efficient in operation and in which the power consumption is relatively low and the space requirements are not large;

Fourth, to provide a process for which there is no special storage space requirement; and Fifth, to provide a process in which the period of operability depends only on the fuel capacity of the submarine.

Figure 1:
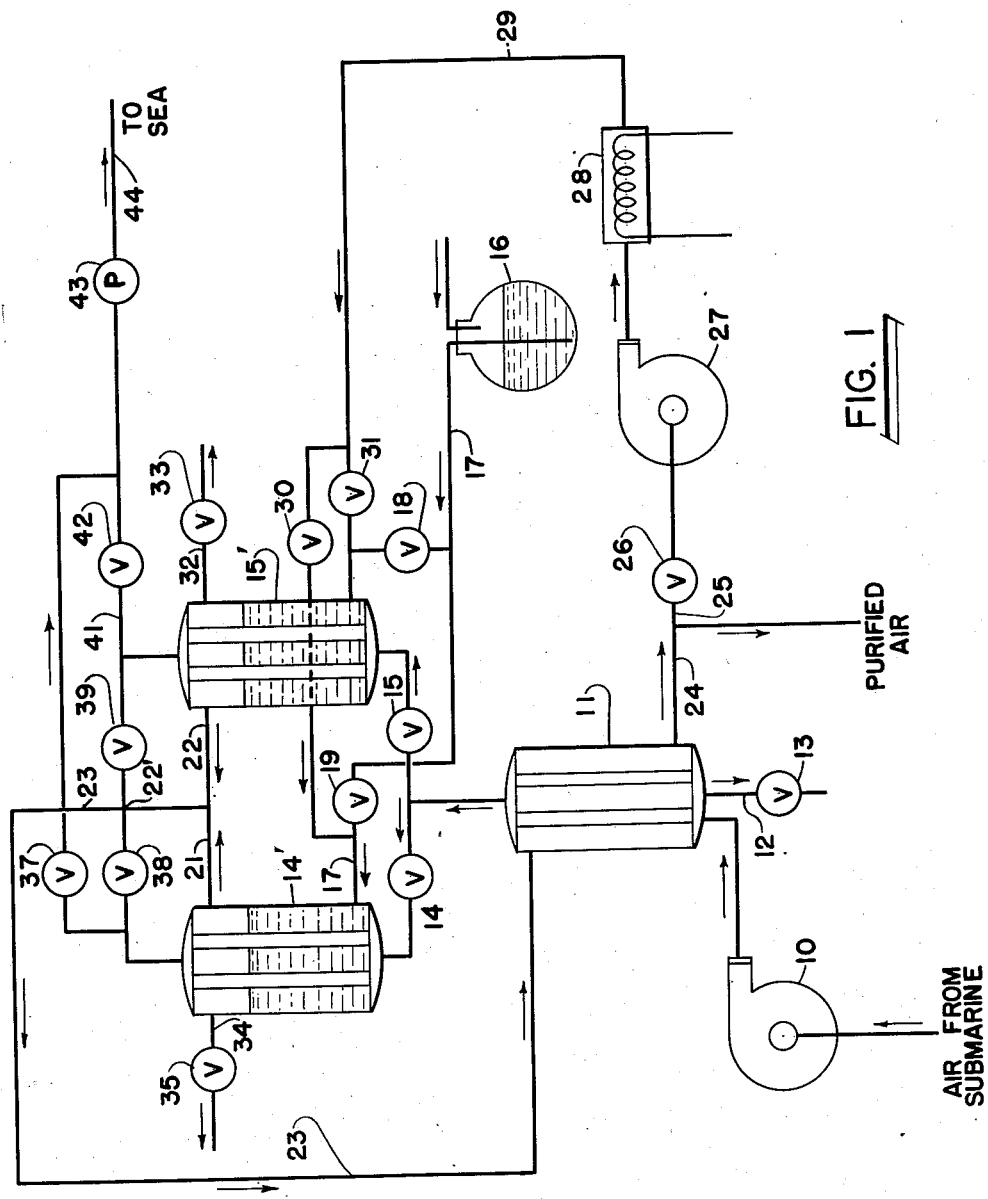
Figure 2:
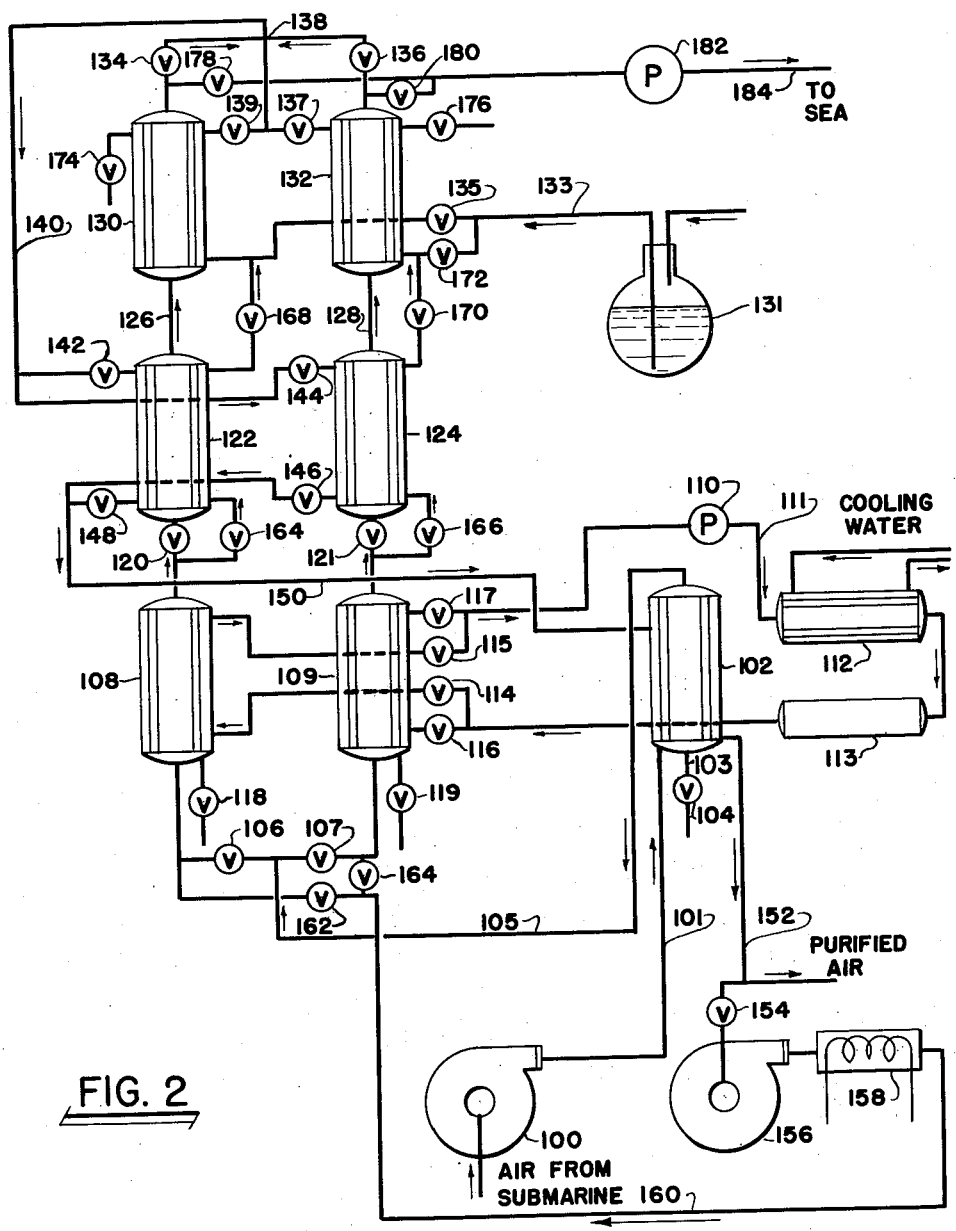
Figure 3:
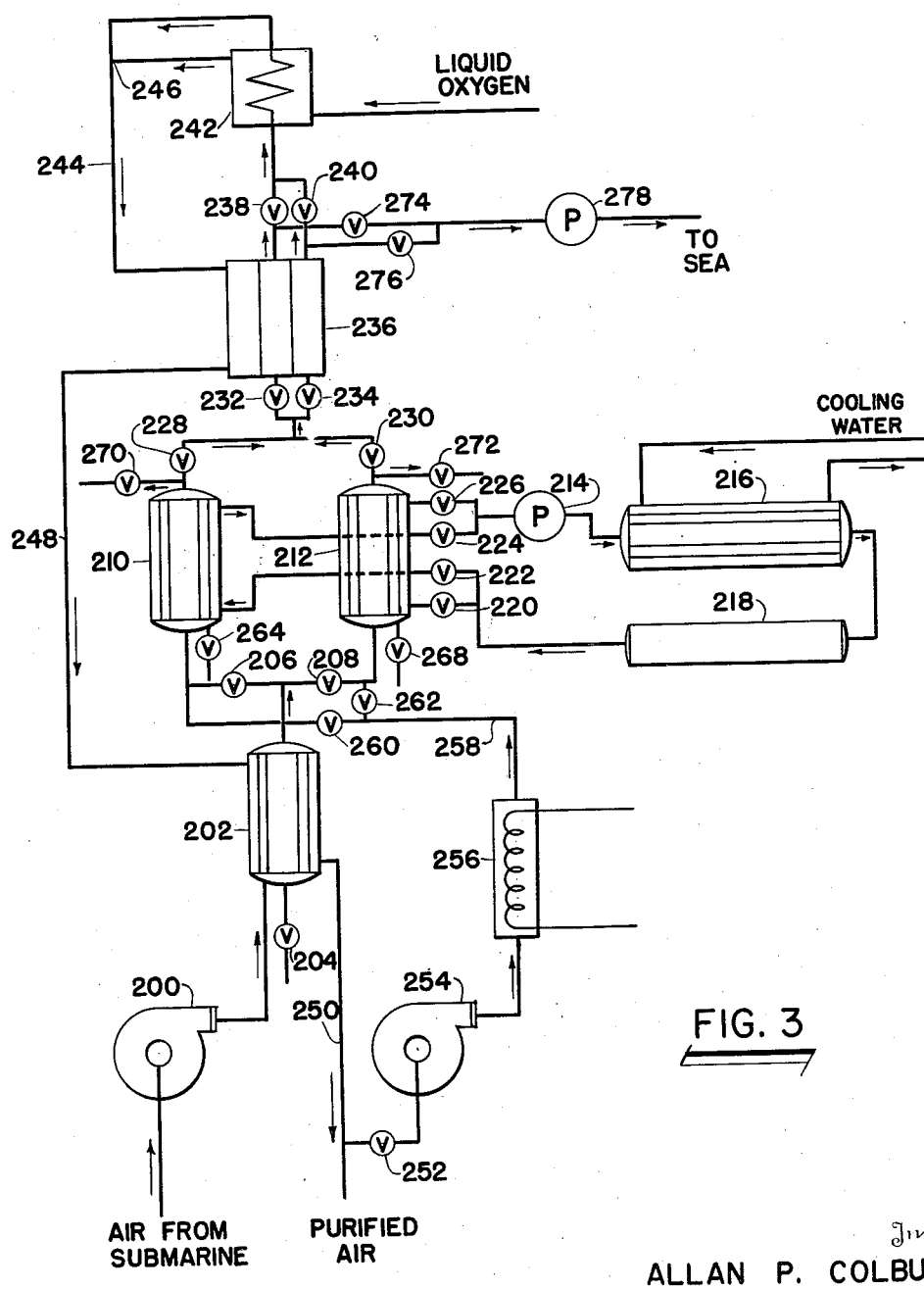
Figure 4:
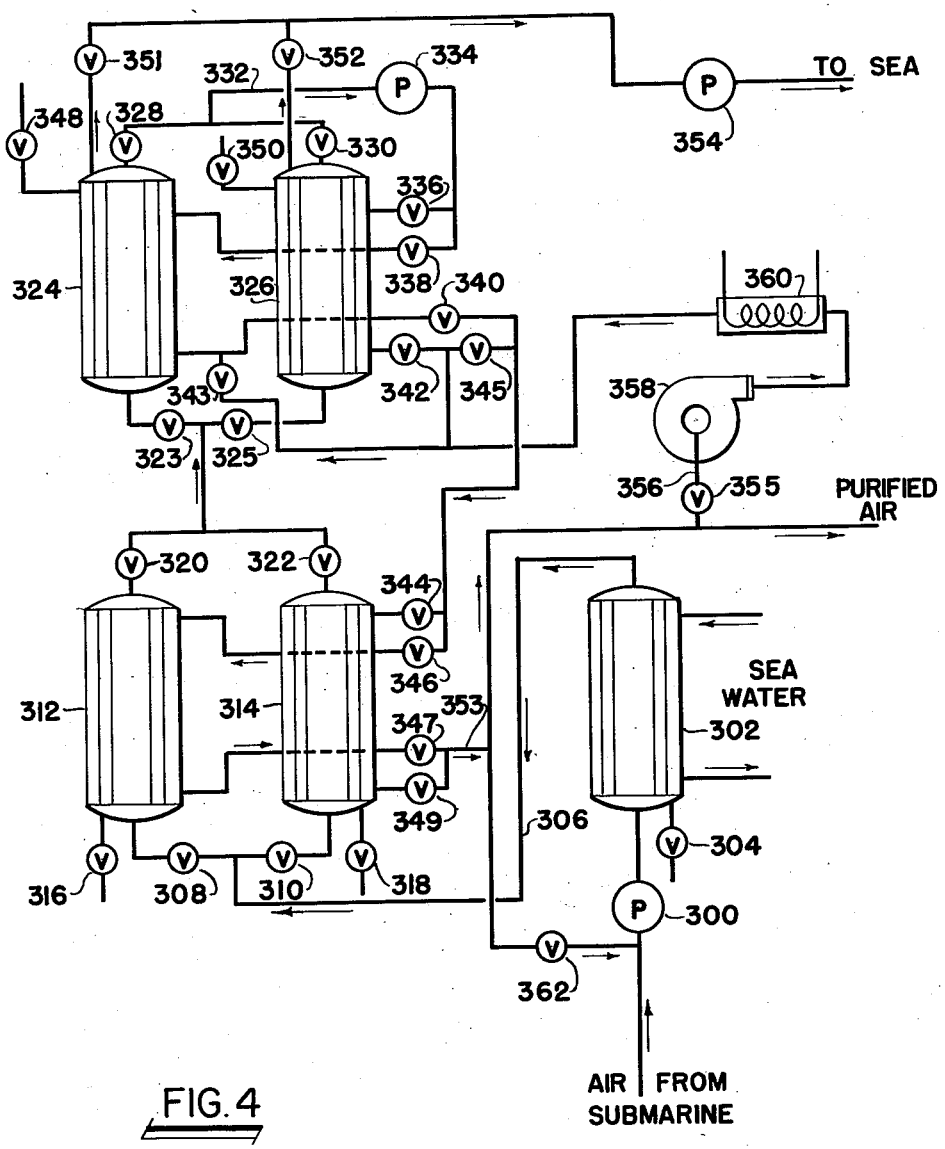

With these objects in view and in order to have a clearer understanding of the preferred embodiment of the refrigerating process and the various modifications thereof, reference is now made to the drawings which are submitted for purposes of exposition and in which:

Figure 1 is a flow chart representing process 1a.
Figure 2 is a flow chart representing process 1b.
Figure 3 is a flow chart representing process 1c.
Figure 4 is a flow chart representing process 1d.

As used in this specification and in the appended claims, the nouns air and atmosphere are synonymous. Both connote breathing air.

In process 1a as represented by Figure 1, liquid oxygen, previously produced when the submarine was on the surface and stored in a flask, is forced by suitable means into a tubular evaporator. Evaporation of oxygen around the tubes cools the air flowing through the tubes at atmospheric pressure and deposits water-ice and carbon dioxide-ice in the tubes. The purified air leaving the evaporator is mixed with the evaporated oxygen and the mixture is brought nearly to room temperature by heat exchange with the ingoing air. A temperature of about 160° K. (—172° F.) is necessary to start carbon dioxide deposition and substantially all the $CO_2$ is deposited when 130° K. (—226° F.) is reached. The exchanger in which the ice deposits is either large enough to hold all of the carbon dioxide and water formed in a run or what is more preferable, there is a twin set of switch exchangers—one is operating and the other thawing to remove the accumulated solid. During the warming cycle, the carbon dioxide will build up sufficient pressure to force itself out into the sea, but the amount so released is so small that there is no serious problem of avoiding detection due to bubbles. Whenever it is desirable to pump off the carbon dioxide at a pressure below that of the sea a compressor is used as indicated in the diagram. As to the danger of detection of a submarine by the trail of gas bubbles which would normally be expected to appear from pumping of the $CO_2$ into the sea, these bubbles will all be dissolved in the sea water and there will be no trail left.

The water is all deposited in the forecooler, the bulk as liquid water and the rest as ice. The carbon dioxide is precipitated only in the oxygen evaporator. In this manner the clogging of the tubes in the oxygen evaporator by the formation of water-ice is prevented.

Referring now to the drawing 10 represents a blower which forces air from the submarine into a heat exchanging forecooler. This is refrigerated by the returning, purified air. In the forecooler moisture contained in the impure atmosphere is condensed and is drained off through valve 13 via pipe 12. The dried impure air then passes through either valve 14 or 15 to the oxygen evaporators 14' or 15' respectively. In these evaporators the evaporating oxygen cools the air to a temperature of —26° F. This low temperature is sufficient to freeze out all of the carbon dioxide contained in the air. The purified air passes out of the evaporators through either valves 38 or 39, as the case may be, through cross 22′ and thence by return line 23 to forecooler 11. The oxygen evaporated in the evaporators 14′ or 15′ is withdrawn through pipes 21 or 22 through the cross 22′ where it is admixed with the oncoming purified air. This mixture returns via pipe 23 to forecooler 11 where it acts as a refrigerant to the oncoming impure air. It returns via pipe 24 either to the submarine atmosphere or part of it is used via pipe 25 and valve 26 through the agency of blower 27 as a source of thawing air. This blower passes the air through an electric air heater 28 and thence through pipe 29 and either valves 30 or 31 to the oxygen evaporator. It is directed to the particular evaporator which is desired to be cleared of solid carbon dioxide. The thawing air is discharged via pipes 32 or 34 and valves 33 or 35 as the case may be. During the thawing operation the gaseous $CO_2$ is withdrawn either through valve 37 or 42 by compressor 43 and is discharged via pipe 44 to the sea.

In process 1b, Figure 2, of the drawings, refrigeration down to a level of about −40° F. is provided by a mechanical refrigeration system of conventional type using Freon 12 or 21 as a refrigerant. Liquid oxygen refrigeration is used at a lower temperature level to deposit the carbon dioxide. In this way the refrigeration load corresponding to water removal is carried by the Freon, reserving the lower temperature level refrigeration for the carbon dioxide removal.

Air enters the system at substantially atmospheric pressure, and is cooled in the forecooler by returning purified air. Part of the water is condensed here and drained off. The air is then cooled to about −40° F. by means of evaporating Freon 12 and at this temperature substantially all of the water will be removed. These dehydrating exchangers are in duplicate so that they can be switched at regular intervals. While the one is being refrigerated by the Freon the other is being thawed to remove accumulated ice. From the dehydrating exchangers the air still containing all of its carbon dioxide goes to the intermediate exchangers whose purpose is to precool the air before it enters the oxygen evaporator. Some carbon dioxide will be deposited in those exchangers and hence they are shown in duplicate. In the oxygen evaporator, the air-carbon dioxide mixture is cooled to about 130° K. (−226° F.) at which temperature all of the carbon dioxide is deposited. The liquid oxygen, produced when the submarine is on the surface and stored in a vacuum-jacketed vessel, is caused to flow around the tubes in the oxygen evaporator where it removes heat from the air stream and condenses the carbon dioxide. The oxygen vapor is mixed with the carbon dioxide-free air returning through the exchanger system so that its heat-absorbing capacity will be used. The oxygen evaporators are in duplicate so that the deposited carbon dioxide can be removed at regular intervals by thawing.

Referring now to the drawing, Figure 2, air from the submarine is driven by blower 100 into forecooler 102 which is cooled by the returning purified air. Some of the moisture contained in the impure air is here condensed and is drained off through pipe 103 and valve 104. The partially dry air then passes via pipe 105 and valves 106 or 107 into the dehydrating exchangers 108 or 109, as the case may be. These dehydrating exchangers are cooled by Freon to a temperature of approximately −40° F. which temperature is sufficient to remove all of the moisture contained in the air. The Freon circuit comprises a compressor 110, a condenser 112 which is cooled by water, and a Freon receiver 113. From the receiver the Freon flows via valve 116 or 114 to the dehydrating exchangers 108 or 109, as the case may be, and is returned via valves 115 or 117 to compressor 110. The dry, impure air then passes either through valves 120 or 121 to the intermediate exchangers which are cooled by the returning purified air and oxygen mixture. These intermediate exchangers 122 and 124 cool the impure air sufficiently so that a part of the carbon dioxide is removed therein. The impure air then passes directly to the oxygen evaporators 130 or 132 where all of the carbon dioxide contained in the air is removed. The purified air is then returned via either valve 134 or 136 and cross 138, pipe 140, valves 142 or 144 to the intermediate exchangers. The evaporated oxygen in the oxygen evaporators is withdrawn through either valves 137 or 139 and is mixed with the purified air at cross 138. The purified air is then withdrawn from the intermediate exchangers through either valves 146 or 148 and is returned via pipe 150 to the forecooler 102 where it acts as a refrigerant for the oncoming impure air. From forecooler 102 the returning purified air is led by pipe 152 either to the submarine atmosphere or a part is withdrawn for thawing air purposes via valve 154 and blower 156 which passes the air through electric heater 158 and thence via pipe 160 and valves 162 or 164 to the dehydrating exchangers 108 or 109. Here the warm air melts the ice formed in the tubes of either one of these exchangers and the water resulting therefrom is withdrawn through either valves 118 or 119. The thawing air then passes either via valves 164 or 166 to the intermediate exchangers where it gassifies any solidified carbon dioxide ice which may be formed in the tubes of these exchangers. This warm thawing air then passes either via valves 168 or 170 to the oxygen evaporators where it thaws all of the remaining carbon dioxide ice. From these oxygen evaporators the thawing air is exhausted through either valves 174 or 176. The carbon dioxide gas formed by the thawing in the intermediate exchangers and the oxygen evaporator is withdrawn through either valves 178 or 180 by the carbon dioxide compressor 182 which discharges the gas via pipe 184 to the sea.

Process 1c as shown by Figure 3 is similar to process 1b but differs from it in the fact that the exchanger in which the carbon dioxide is deposited is a 3-pass exchanger. (This refers to an exchanger that has passes for three fluids that must be mechanically separated but which can freely exchange heat with one another.) One of the passes carries the returned air mixed with evaporated oxygen. The other two passes are arranged to be switched at some regular interval of time, perhaps every one or two hours, so that the carbon dioxide is alternately deposited in the one and then in the other. The pass which is not depositing carbon dioxide from the air stream is connected to a vacuum pump and compressor which continuously evaporates the previously deposited carbon dioxide. In this way the heat of condensation of carbon dioxide is recovered and does not constitute a load on the low temperature refrigeration supplied by the liquid oxygen. The same principle can be applied to the recovery of the latent heat of the water but this application has not been included in the diagram of the process, since the advantage to be gained is not as great in this case. Recovery of the latent heat of the carbon dioxide saves a considerable amount of oxygen but recovery of latent heat of water only reduces the size and power requirements of the Freon refrigerating system, both of which are already small.

In the diagram as shown by Figure 3 blower 200 withdraws air from the submarine and forces it through forecooler 202 which is cooled by the returning purified air and evaporated oxygen. Some moisture in the air is condensed here and is withdrawn through valve 204. The partially dry air then passes via valve 206 or 208 to the dehydrating exchangers 210 or 212, as the case may be. These exchangers are cooled by a Freon refrigerating system to a temperature sufficient to remove all of the moisture in the air. This Freon refrigerating system includes a Freon compressor 214 which discharges the compressed Freon into a condenser 216 which is water cooled. The condensed Freon then passes to receiver 218 whence it is distributed to either of the dehydrating exchangers 210 or 212 via valves 220 or 222. The returning Freon passes via either valves 224 or 226 to the Freon compressor 214 thereby completing the circuit. The dry impure air then passes from these dehydrating exchangers via either valves 232 or 234 into a 3-pass exchanger 236. This exchanger is cooled by the returning purified air and evaporated oxygen. The purified air then passes via valves 238 or 240 to the oxygen evaporator 242. The function of this oxygen evaporator is to supply the oxygen required to bring the submarine atmosphere up to normal. It also cools the purified air down to a temperature sufficient to condense the carbon dioxide to solid form in the three pass exchanger. Evaporated oxygen is mixed with a purified air at T 46. The mixture of purified air and evaporated oxygen passes from the heat exchanger 236 via pipe 248 to forecooler 202 where it functions as a refrigerant for the oncoming impure air. The mixture of purified air and evaporated oxygen then passes via pipe 250 to the submarine atmosphere. A part is withdrawn for thawing purposes via valve 252 and blower 254 which drives the mixture through electric heater 256 and pipe line 258 and either valves 260 and 262 to the dehydrating exchangers 210 or 212. From these dehydrating exchangers the thawing air is discharged either by valve 270 or 272, as the case may be, to the submarine atmosphere.

In process 1d which is illustrated by Figure 4 the air to be purified is compressed to about 150 pounds per square inch pressure, cooled by sea water, dehydrated by cooling with returned expanded air and then passed through another set of exchangers where it is sufficiently cooled by expanded air to deposit substantially all of the carbon dioxide. The compressed carbon dioxide-free air is then expanded in an engine to produce the necessary refrigeration to maintain the low temperature. The dehydration and carbon dioxide exchangers are in duplicate to permit intermittent operating and deriming and thus maintain continuous operation without the necessity of making these large enough to store the entire accumulation of ice and carbon dioxide snow for the whole period of the operation.

In the embodiment as shown by Figure 4 air compressor 300 draws the air from the submarine and forces it through aftercooler 302 which is cooled by sea water. Some moisture contained in the impure air is condensed in this aftercooler and the condensate is withdrawn through valve 304. The air then passes via pipe 306 and either valves 308 or 310 to the dehydrating exchangers 312 or 314 as the case may be. Dehydrating exchangers 312 and 314 are refrigerated by the returning expanded purified air. The dry impure air then passes via either valves 320 or 322 and 323 or 325 to either one of the pair of carbon dioxide exchangers 324 or 326. These exchangers are refrigerated by the expanded purified air. The carbon dioxide is removed from the air by freezing in these exchangers. The purified air then passes via valves 328 or 330 and pipe line 332 to the expander 334. From the expander the purified air then passes either by valves 336 or 338 to the cooling side of the exchangers 324 or 326. The purified air then passes via either valves 340 or 342 and valves 344 or 346 to the dehydrating exchangers. Thence it is withdrawn via valve 347 or 349 and pipe 353 whence it is returned as purified air to the submarine atmosphere. A part of this air may be withdrawn through valve 362 for recirculation in the event that the carbon dioxide removal has not been complete. Also a part is withdrawn through valve 355 in pipe 356 and blower 358 for thawing purposes. Blower 358 forces the air through electric heater 360 and then via either valves 342 or 343 to the carbon dioxide exchangers 324 and 326. In either one of these exchangers the thawing air melts the solidified carbon dioxide and is discharged to the atmosphere of the submarine via valves 348 or 350. The carbon dioxide gas is withdrawn through either valves 351 or 352 by compressor 354 and is discharged to the sea.

While the foregoing description has been limited to the purification of the atmosphere of a submarine, it is not desired to be strictly limited thereto since, obviously, the process and modifications thereof as described are applicable to the purification of any atmosphere containing carbon dioxide and moisture and are within the spirit and scope of the invention to the extent as defined by the appended claims.

What is claimed is:

1. A process for the continuous purification by refrigeration at atmospheric pressure, of air containing moisture and carbon dioxide and wherein said air comprises the atmosphere of a confined space; said process including the following steps: forcing air from said space into a heat exchanger having a heating side and a cooling side; operating said exchanger at a temperature sufficiently low to condense substantially all of said moisture; discharging said condensed moisture from said exchanger; forcing said dried air into an evaporator; evaporating oxygen in said evaporator until its temperature becomes sufficiently low to freeze substantially all of said carbon dioxide; forming a mixture of said evaporated oxygen and said purified air; returning a first portion of said mixture to said cooling side of said exchanger; utilizing said first portion as a refrigerant in said exchanger; heating a second portion of said mixture; forcing said heated second portion of said mixture through said evaporator and utilizing said heated second portion of said mixture to defrost frozen carbon dioxide in said evaporator after the cooling has been stopped; returning said second portion of said mixture to said space; returning the third and remaining portion of said mixture to said space; and discharging said gaseous carbon dioxide from said evaporator.

2. A process for the continuous purification by refrigeration at atmospheric pressure, of air containing moisture and carbon dioxide and wherein said air comprises the atmosphere of a confined space; said process including the following steps:

forcing air from said space into a heat exchanger having a heating side and a cooling side; operating said exchanger at a temperature sufficiently low to condense substantially all of said moisture; discharging said condensed moisture from said exchanger; forcing said dried air into one of a pair of cooperating evaporators; evaporating oxygen in said one evaporator until its temperature becomes sufficiently low to freeze substantially all of said carbon dioxide; forming a mixture of said evaporated oxygen and said purified air; returning a first portion of said mixture to said cooling side of said exchanger; utilizing said first portion as a refrigerant in said exchanger; heating a second portion of said mixture; returning the third and remaining portion of said mixture to said space; forcing said heated second portion of said mixture through the other of said evaporators; utilizing said heated second portion of said mixture to evaporate said solid carbon dioxide in said other evaporator; returning said second portion of said mixture to said space; and discharging said gaseous carbon dioxide from said other evaporator.

ALLAN P. COLBURN.
BARNETT F. DODGE.

REFERENCES CITED

The following references are of record in the file of this patent:

UNITED STATES PATENTS

| Number | Name | Date |
|---|---|---|
| 1,040,886 | Claude | Oct. 8, 1912 |
| 1,979,682 | Frankl | Nov. 6, 1934 |
| 2,252,739 | Stoever | Aug. 19, 1941 |